United States Patent
Helfinstine et al.

(10) Patent No.: US 6,582,845 B2
(45) Date of Patent: Jun. 24, 2003

(54) SOLID OXIDE ELECTROLYTE, FUEL CELL MODULE, AND METHOD

(75) Inventors: John D. Helfinstine, Big Flats, NY (US); Thomas D. Ketcham, Big Flats, NY (US); Eric J. Maher, Corning, NY (US); Dell J. St. Julien, Watkins Glen, NY (US)

(73) Assignee: Corning Incorporated, Corning, NY (US)

( * ) Notice: Subject to any disclaimer, the term of this patent is extended or adjusted under 35 U.S.C. 154(b) by 88 days.

(21) Appl. No.: 09/737,706

(22) Filed: Dec. 15, 2000

(65) Prior Publication Data
US 2002/0076593 A1 Jun. 20, 2002

Related U.S. Application Data
(60) Provisional application No. 60/173,133, filed on Dec. 27, 1999.

(51) Int. Cl.[7] .................................................. H01M 8/10
(52) U.S. Cl. .............................. 429/33; 429/32; 429/46; 252/62.2
(58) Field of Search .............................. 429/30, 41, 46, 429/33, 32; 252/62.2

(56) References Cited

U.S. PATENT DOCUMENTS

| 5,069,987 A | 12/1991 | Gordon |
| 5,089,455 A | 2/1992 | Ketcham et al. |
| 5,273,837 A | 12/1993 | Aitken et al. |
| 5,409,371 A | 4/1995 | Gordon |
| 6,045,935 A | * 4/2000 | Ketcham et al. ............... 429/30 |

FOREIGN PATENT DOCUMENTS

| WO | 92/00934 | 1/1992 |
| WO | 94/44254 | 9/1999 |

OTHER PUBLICATIONS

The Electrochemical Society, Inc., Proceedings of the Third International Symposium on Solid Oxide Fuel Cells, vol. 93–4, pp. 74–81. No month available.

* cited by examiner

Primary Examiner—Stephen Kalafut
Assistant Examiner—R Alejandro
(74) Attorney, Agent, or Firm—Kees van der Sterre

(57) ABSTRACT

Flexible ceramic sheets with enhanced strain tolerance for electrochemical applications such as solid oxide fuel cell electrolytes incorporate a surface indentation pattern providing a strain tolerance of not less than 0.5% in any direction in the sheet plane, being made from flexible green ceramic sheet comprising a ceramic powder and a thermoplastic organic binder by heating and reshaping the green sheet to form a multi-directional surface corrugation pattern therein, followed by firing to sinter the ceramic powder to a flexible ceramic sheet having a multi-directional surface corrugation pattern.

9 Claims, 3 Drawing Sheets

(a)

(b)

(c)

(a)

(e)

(b)

(f)

(c)

(g)

(d)

US 6,582,845 B2

SOLID OXIDE ELECTROLYTE, FUEL CELL MODULE, AND METHOD

This application claims the benefit of U.S. Provisional application No. 60/173,133, filed Dec. 27, 1999, entitled "Solid Oxide Electrolyte, Fuel Cell Module, and Method", by Helfinstine et al.

BACKGROUND OF THE INVENTION

The present invention is in the field of electrochemical devices and more particularly relates to flexible ceramic sheets for solid electrolytes and electrolyte/electrode assemblies for devices such as fuel cells.

U.S. Pat. No. 5,089,455 describes strong, thin, flexible ceramic sheets and tapes of various compositions, and methods for making them. As taught in U.S. Pat. No. 5,273,837, such sheets can be used to provide solid oxide electrolytes and other components for fuel cells that exhibit improved resistance to thermal shock damage due in part to the flexibility and high strength of the ceramic sheets. Further, U.S. Pat. No. 5,519,191 describes the incorporation of thin ceramic sheets into fluid heating structures of corrugated shape that include thin conductive metal layers as electrical heating elements.

Curved electrode and electrolyte designs that reduce the thermal stresses arising during the normal operation of fuel cells are disclosed in published PCT patent application WO99/44254. The use of corrugated planar electrode/electrolyte sheets to control such stresses is proposed by K. Tomida et al. in "Preparation of Solid Electrolyte Thin Films for Relaxing Thermal Stresses", Proceedings of the Third International Symposium on Solid Oxide Fuel Cells, Proceedings Volume 93–4, pages 74–81, Singhal and Iwahara, Editors, The Electrochemical Society, Inc. (1993).

Substantially planar electrolyte sheets supporting cathodic and anodic electrode layers have been proposed for use in a number of different fuel cell configurations, including configurations that may be characterized as stacked fuel cell designs. In one such stacked design, each planar electrode/electrolyte sub-unit is bonded to and edge-supported by a framing manifold structure, with multiple frames and sub-units being stacked and electrically interconnected in parallel or series to provide the fuel cell output current or voltage required for the particular application of interest.

In this and similar manifolded fuel cell arrangements, even perfect thermal expansion matching of the electrolyte/electrode sheets to the supporting manifold structure does not avoid thermal cycling stress. This is because the manifold structures typically have much higher thermal mass than the sheets, and heat and cool sufficiently more slowly than the electrolyte/electrode sheets that the electrolyte/electrode sheets can be put into severe tension in many sheet directions at once regardless of the extent to which thermal expansion matching is employed.

Unfortunately, the known materials and designs for thin ceramic fuel cell electrolytes do not provide the level of thermal durability necessary to insure dependable fuel cell operation in stacked and other configurations during the extended temperature cycling that cannot be avoided in normal service. In particular, prior art electrolytes do not provide the requisite combination of high multiaxial strain tolerance and high resistance to damage under large strains that will be needed to secure dependable long-term service in fuel cells.

SUMMARY OF THE INVENTION

The present invention provides highly strain tolerant ceramic electrolyte layers wherein the electrolyte is formed of a strong, thin ceramic sheet incorporating a two-dimensional surface indentation pattern. For example, flexible ceramic sheet having a surface indentation pattern providing a strain tolerance of not less than 0.5% in any direction in the sheet plane, more preferably a strain tolerance of at least 1% in any direction in the sheet plane, can readily be provided by means hereinafter described.

Useful indentation patterns are those that impart a very high multi-axial strain tolerance to the sheet, within the plane of the sheet, without introducing stress concentrators that reduce sheet strength. Examples of suitable indentation patterns are those comprising multidirectional corrugations or waves, protrusions or indentations of circular, polygonal, or other cross-section, and other contiguous or overlapping indentations or protrusions that do not introduce sharp sheet curvature and do not alter the generally planar configuration of the sheet. One-dimensional patterns, such as single-direction corrugations that provide only uni-axial strain tolerance, are not useful.

The preferred indentation patterns allow not only large in-plane effective strains but also large elastic deformations normal to the plane of the sheet. This permits the sheets to withstand large thermal gradients and large thermal expansion differentials from associated other fuel cell components without risking electrolyte fracture and loss of effective current generation.

The invention further includes a process for making thin, strain-tolerant ceramic sheet for electrolyte and electrolyte/electrode fabrication. In general the process involves the steps of forming a thin cohesive green sheet layer on a suitable fugitive support, forming patterned indentations in the sheet while in the green state, and then consolidating the sheet with its impressed indentation pattern by sintering to remove binders and any fugitive supports. Methods that can be used to impress the desired indentation pattern in the green sheet include vacuum forming, pressing, roll pressing, embossing, or other conventional surface shaping procedures.

Strain tolerant electrolyte sheets produced as described can be employed in a variety of different fuel cell configurations, but are of particular value in planar stacked fuel cell designs. This is because the strain-tolerant electrolyte sheets of the invention offer much higher resistance to mechanical failure under temperature cycling conditions, particularly in an edge-supported electrolyte configuration, than do conventional corrugated or other electrolyte sheet designs.

DESCRIPTION OF THE DRAWINGS

The invention may be further understood by reference to the drawings, wherein.

DETAILED DESCRIPTION

Figure 1:
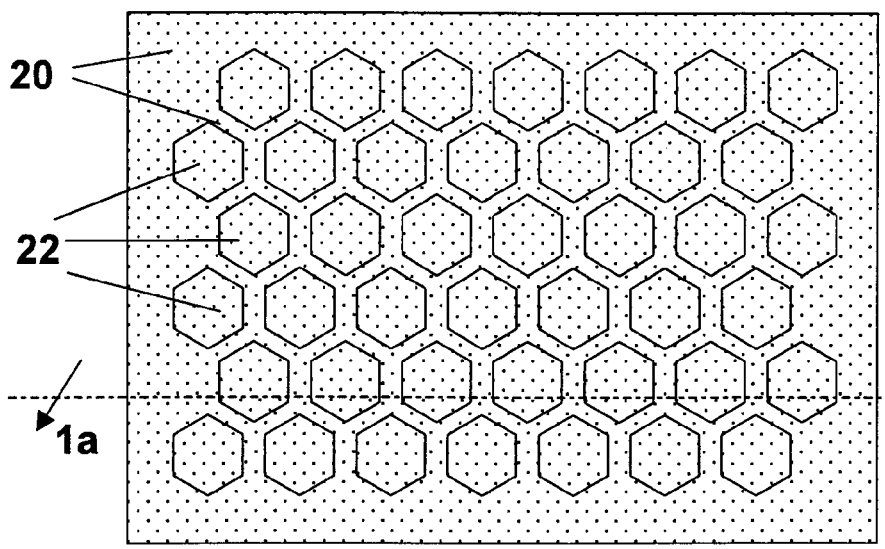
FIGS. 1–1a illustrate an electrolyte sheet incorporating a full-surface hexagonal indentation pattern in accordance with the invention.

Anode- and cathode-supported solid oxide fuel cells with thin electrolyte layers are of immediate commercial interest because of the impressive single cell power "densities" that have recently been reported. Some single cell power densities above 1 watt/cm$^2$ have been measured under ideal laboratory conditions. The electrolyte in these single cells has a thickness below about 50 microns, approaching 10 microns or thinner. Co-calendering, laminated cast tapes, colloidal coating on partially sintered electrodes and other methods such as co-tape casting and even ECVD and other vapor/powder deposition methods can be used to make such single cells.

The supporting electrode in these cell configurations is relatively thick, e.g., from 300 microns to 2,000 microns in thickness. The objective of combining a thin electrolyte with a relatively thick electrode, usually the anode, is to provide mechanical support for the thin electrolyte. Corrugations of the type we disclose here will not result in a major improvement in strain tolerance in cells incorporating electrodes of this thickness.

Electrode-supported fuel cells have been reported wherein the electrode surface has been textured to give higher surface area along the plane of the electrolyte, in order to increase the apparent power density. However, without a matching texture across the entire tri-layer anode/electrolyte/cathode composite structure, there will be minimal improved strain tolerance. And, if the electrode is too thick or has a high elastic modulus or has low fracture strength, improved strain tolerance will be minimal.

For performance and also for material usage (cost) reasons, anode- and cathode-supported thin electrolyte SOFC cell designs will not benefit greatly from the thin electrolyte and electrode approaches of the invention unless electrode/electrolyte/electrode tri-layers below about 150 microns in total thickness, perhaps approaching 50 microns in total thickness are, to be employed. However, within these thickness ranges electrode-supported tri-layers will clearly benefit from corrugation of the entire tri-layer structure, particularly if at the same time attention is given to eliminating large strength reducing flaws, layering the cells with surfaces in compression, or other material strengthening/toughening measures.

Lowering the elastic modulus of the outside surface layers of the cell will also help to improve structural strain tolerance. If the anode is graded such that there is primarily nickel metal on the exterior of the electrode, some ductility in that exterior surface will be present. Ductility of the metal electrode exterior can be used in conjunction with corrugation and a thin electrolyte/electrode structure to further enhance strain tolerance, providing a measure of strain tolerance not previously obtainable in electrode-supported cells.

In all solid oxide fuel cells, maintaining good electrical contact between the interconnects and the electrodes is necessary for good performance. Contact problems often arise in stacked planar fuel cell assemblies, especially those incorporating relatively dense electrolyte/electrode/manifold structures, as the result of temperature gradients along the gas flow directions within the device that cause differential thermal strains to warp and twist the structure.

One advantage of the use of flexible electrolyte/electrode sheets in frame-supported designs is the ability to shape the edges of the sheets to improve edge sealing and reduce loss of contact problems. Advantageously, where electrolyte/electrode sheets with large effective multi-axial strain tolerances are used, not only is the risk of mechanical failure and/or loss of electrical contact in the edge seals reduced, but also sheet resilience in directions normal to the sheet plane is improved, significantly lowering the likelihood of sheet fracture and/or loss of electrical contact through structural warpage.

The particular sheet indentation or multi-directional corrugation pattern used to impart high multi-directional effective strain tolerance to the sheet may be chosen according to the particular needs of the environment within which the fuel cell elements are intended to operate. Among the patterns that that give the largest and most uniform effective strain tolerance in multiple directions are patterns such as such as hexagons and Penrose tiles (quasi—periodic structures), "T" shapes, woven squares, bow ties, wiggly squares, flex rectangles (herringbone patterns), and certain combinations of squares and octagons.

Patterns that are not useful to build the required multidirectional strain tolerance are those that have straight corrugation ridges, or straight paths or areas of completely flat sheet, running in straight uninterrupted lines from one edge of the sheet to another. Uninterrupted ridge or flat lines in the sheet surface define axes of very low strain tolerance in the sheet plane, greatly increasing the risk of sheet or contact failure in the event that significant stresses along such axes arise in the course of use. Patterns of this type include parallel corrugation patterns, and also many regular indentation patterns based on repeating triangles, squares and rectangles if the indentations are not appropriately staggered to avoid linear ridges or flats.

Figure 4:
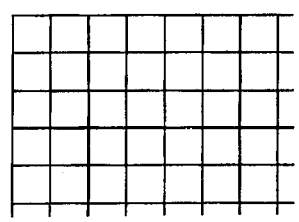
FIGS. 4a–4c illustrate examples of multi-directional corrugation patterns outside the scope of the invention.
Figure 4:
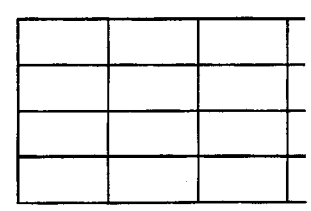
Figure 4:
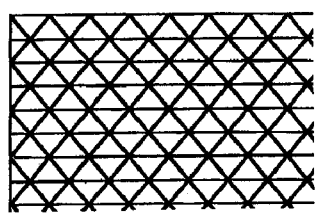
Figure 5:
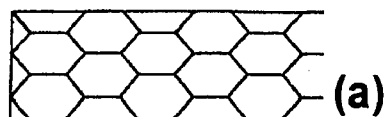
FIGS. 5a–5f illustrate examples of multi-directional corrugation patterns imparting high effective strain tolerance to flexible ceramic sheets provided in accordance with the invention.
Figure 5:
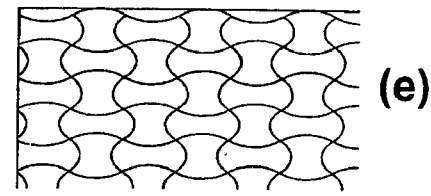
Figure 5:
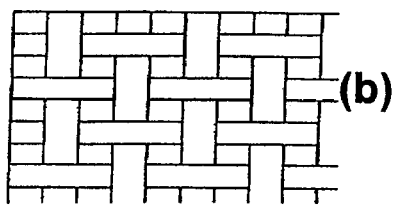
Figure 5:
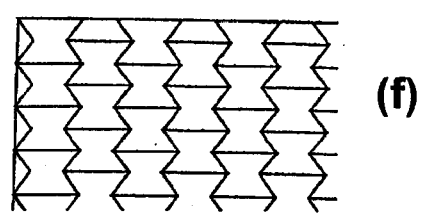
Figure 5:
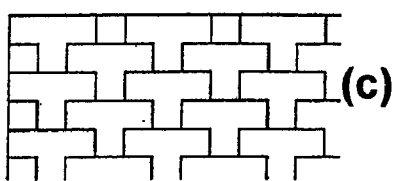
Figure 5:
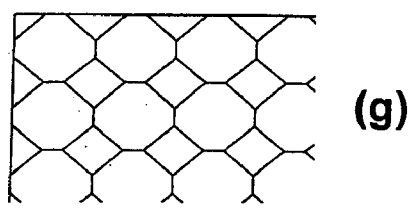
Figure 5:
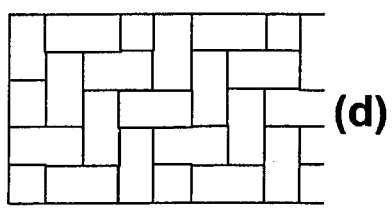

FIGS. 4a–4c of the drawing illustrate multidirectional corrugation patterns that are not useful to provide strain-tolerant electrolyte sheets in accordance with the invention. In those figures, the lines represent the outlines or borders of sheet indentations or protrusions having the shapes enclosed by the lines. A shared characteristic of all of these designs is that substantially all of the lines correspond to flat straight paths spanning the entire widths or lengths of the sheets. Accordingly the corrugation patterns shown, although multi-directional in nature, impart essentially no enhanced strain tolerance to the sheets in directions parallel to those span lines.

FIGS. 5a–5f of the drawing, on the other hand, illustrate multidirectional corrugation patterns that increase the strain tolerance of the sheet in every direction in the sheet plane. The indentation patterns represented by these line drawings are characterized by the complete absence of span lines corresponding to straight ridge or flat lines crossing the entire lengths or widths of the sheets.

Concentric corrugations are appropriate for circular or near circular electrolyte sheet but are not as useful for rectangles and square sheets. Radial corrugations that have straight ridge lines running from one edge of a square or rectangular sheet to the opposite edge of the sheet are not useful. Concentric corrugations can have curved ridge lines from one edge of a square or rectangular sheet to the adjacent edge of the sheet. Of course, completely a-periodic patterns, if free of straight ridge or flat lines, could also be used.

While increasing the depth of the selected indentation patterns theoretically increases the effective strain tolerance attainable in the sheets, overly deep indentations involving a high rate or sharpness of change in plane are generally avoided for a number of reasons. First, shallow corrugations are more compatible with conventional electrode deposition methods such as screen printing, and additionally preserve a substantially planar electrode/electrolyte shape that simplifies the design of associated fuel cell elements such as electrical contacts and current collectors. Secondly, deeper indentations can give rise to abrupt sheet curvatures that act as stress concentrators at higher sheet elongations. Thus the theoretical strain increases of deep indentation designs can be more than offset by reductions in sheet failure stress arising from stress concentrations developed in the sheets when under high strain.

Impressing the selected indentation patterns on thin ceramic sheet can be accomplished in a number of different ways. For example, sufficiently thin ceramic sheet materials can be reformed through a process of superplastic deformation at high temperatures below their melting temperatures.

However, more effective and economic sheet patterning can be achieved according to the invention through the process of reshaping unfired green sheet at or near room temperature prior to sintering to an integral ceramic film. Binder formulations useful for the tape-casting of powdered ceramics are known that offer sufficient plasticity and elongation to permit easy room-temperature pressing of many of the useful indentation patterns. Alternatively, green ceramic sheet formed by tape casting powder dispersions or suspensions together with thin thermoplastic base films can be processed by any of the various embossing or vacuum reforming methods useful for surface patterning plastics, with the base film providing any needed additional support for the green ceramic sheet throughout the reforming process.

The following illustrative Example describes one low-temperature reforming method that may be used.

EXAMPLE

Production of Strain-Tolerant Ceramic Sheet

A green polymer-bonded ceramic powder sheet is made from a zirconia powder as follows. A ceramic slip is first prepared by combining a yttria-stabilized zirconia powder (TZ-3Y powder from the Tosoh Corporation, Japan) with a vehicle consisting of a mixture of ethanol, butanol, propylene glycol and water. 100 g of the zirconia powder free of contaminants is added to a previously prepared mixture of 36.4 g of ethanol, 8.8 g of 1-butanol, 2 g of propylene glycol, 2.5 g of distilled water, and 1 g of a liquid dispersant (Emphos PS-21A dispersant from the Witco Chemical Company). The resulting powder dispersion is transferred to a milling bottle and is vibration-milled for 72 hours using zirconia balls as the milling media.

To remove coarse zirconia particles from the suspension and narrow the particle size distribution in the final slip, the milled suspension is processed through a double settling process wherein it is first allowed to settle for 72 hours and the liquid then separated from the sediment by decantation. The resulting slip is then allowed to settle for another 24 hours and separated from the sediment for final processing.

The slip thus provided is next flocculated through the addition of an alcohol-acetic acid mixture consisting of 50% of glacial acetic acid and 50% of isopropyl alcohol by weight. This mixture is added to the slip in a proportion sufficient to provide 1 part of acetic acid for each 100 parts by weight of ceramic powder remaining after settling, and the acidified slip is then shaken to assure complete mixing. After the addition of the flocculant, film-forming additives consisting of about 3.5 parts by weight of a dibutyl pthalate liquid plasticizer and 6 parts by weight of a polyvinyl butyral powder binder are added to the slip for each 100 parts by weight of zirconia powder remaining after settling, with gentle shaking after each addition to achieve thorough mixing. The resulting slip has a viscosity suitable for tape casting.

A flexible cohesive zirconia sheet is formed from this slip by casting it onto a thin methyl cellulose release layer previously applied to a flat casting surface. The release layer consists of a dried tape-cast methyl cellulose coating of about 0.0005 inch thickness formed from a 2% (wt.) aqueous solution of Dow K-75 Methocel® cellulose. The tape-cast layer thus provided provides a flexible green ceramic sheet layer after the removal of volatile slip vehicle components by drying.

After this flexible ceramic sheet layer has been formed, a supporting acrylic polymer overlayer is tapecast over the ceramic sheet and dried. This overlayer is provided from an acrylate solution containing 71% of ethyl acetate solvent to which 25% of polymethylmethacrylate powder and 3.5% of dibutyl pthalate (Aldrich Chemical Company) have been added. The acrylate solution is tapecast and then dried to provide a flexible polymer film overcoating. This layer adheres well to the underlying ceramic sheet layer, providing a cohesive composite sheet consisting of the ceramic sheet and acrylate overcoating. This cohesive composite sheet is easily separated from the cellulose release layer after all layers have been completely dried.

Figure 2:
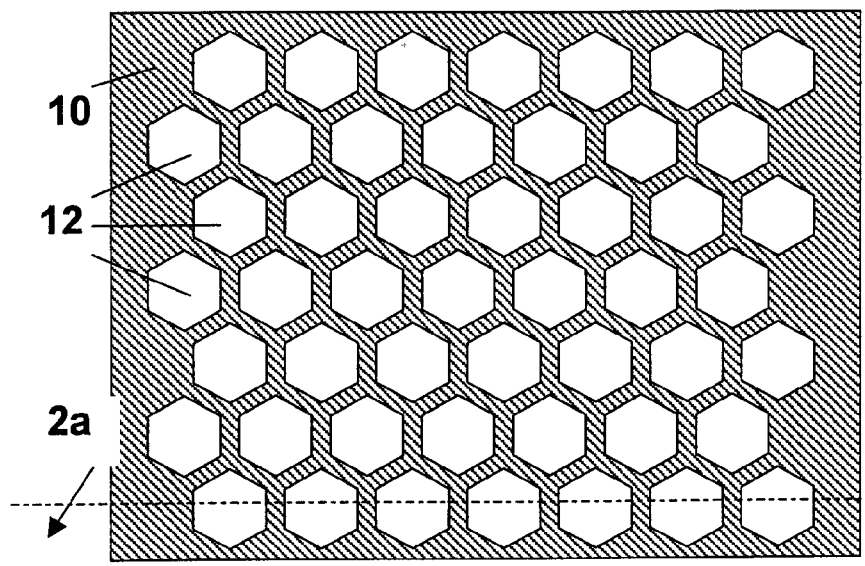
FIGS. 2–2a illustrate an electrolyte sheet incorporating a peripheral surface portion incorporating an indentation pattern in accordance with the invention.
Figure 2A:

To shape a strain-tolerant zirconia sheet from the composite green ceramic sheet thus provided, a metal form with regularly spaced hexagonal cutouts is provided. This form consists of a metal grid about 0.6 mm in thickness incorporating hexagonal cutouts in a close-packed array made up of offset rows of hexagons forming a honeycomb pattern, with a row-to-row center spacing of 6.5 mm. The residual metal framework surrounding the cutouts provides separating ribs about 0.6 mm in width and 0.6 mm in height between each hexagon and its six neighboring hexagons. FIGS. 2–2a of the drawing illustrate a metal form of this design, wherein a plurality of hexagonal cutouts 12 are arranged in close-packed array within form 10.

To form multi-directional corrugated zirconia sheet the metal form thus provided is placed on a vacuum table and the table and form are preheated to about 60° C. A section of the composite green ceramic sheet about 31 cm by 24 cm in size made as above described is then placed over the form and an insulating section of polymer foam board is placed over the sheet and form to allow them to reach uniform temperature. The vacuum table is then activated for about ten seconds, following which the vacuum is released and the green ceramic sheet is removed from the form and inspected.

The multi-directionally corrugated sheet resulting from this reforming step is a regularly indented green ceramic sheet incorporating hexagonal indentations separated from each other by spacings corresponding to the spacings between adjacent hexagonal cutouts in the metal honeycomb form. This green sheet is trimmed to even rectangular shape with a rotary cloth cutter and then sintered in air on a refractory setter in an electric kiln operating at 1430° C. for a period of two hours. The fully sintered sheet is then removed from the kiln and examined.

Figure 1A:

FIGS. 1–1(a) of the drawing present a schematic top plan and a front elevational cross-sectional view, respectively, of a ceramic sheet 20 which has been fully sintered to set a hexagonal indentation pattern incorporating a plurality of hexagonal indentations 22 established during reforming of the green sheet substantially as above described. When made in accordance with this procedure the sintered sheet will be of zirconia-3 mole % yttria composition with a thickness of about 20 um, supporting an array of hexagonal indentations about 0.15 mm in depth with a row-to-row center spacing of about 4.5 mm between the rows of the hexagons. The unusually high multidirectional strain tolerance of this sheet is manifested by an easily discerned stretch or "give" in the sheet when manually stressed in the sheet plane. The strain tolerance of the free-standing sheet is measured to be in excess of 1% without cracking.

Variations in the reforming procedure employed to process green ceramic sheets can be used to change the nature or extent of the indentation patterns developed. For example, using shorter vacuum forming times, e.g., of 1 to 3 or 4 seconds in duration, give shallower corrugations, while using a polyethylene sheet on top of the green ceramic sheet to increase vacuum retention, or using longer forming times, give deeper (higher) corrugations.

As previously noted, however, attempting to address the problems of thermal stress through the use of widely spaced corrugations of excessive height or curvature, instead of shallow, closely spaced corrugations, limits strain tolerance and ultimate failure strength of the ceramic sheet. An illustrative example of this effect is provided by the hypothetical case of a bi-directionally corrugated yttria-stabilized zirconia (YSZ) sheet of about 40 micrometers thickness featuring a criss-crossing array of relatively large but abrupt corrugations or ridges. The corrugations would be offset 90 degrees from each other at a ridge spacing of approximately 1 cm, a ridge height of about 2 mm, and a ridge base width of about 1 mm, with a radius of curvature for the ridge edges of 0.4 mm.

While the two-dimensional corrugations in this sheet would improve sheet strain tolerance in multiple directions in the sheet plane, free-standing ceramic sheet of this type will suffer crack damage at strains well below useful levels. Such cracking failures will most often occur at corrugation peak locations, due to the depth and spacing of the corrugations employed and the concentration of bending stresses at corrugation ridges.

For the foregoing reasons, indentation patterns provided in accordance with the invention will have indentation populations along any axis in the plane of the sheet at least adequate to permit theoretical sheet elongations of 1% or greater in all directions within the plane of the sheet. Desirably, for sintered zirconia-based ceramic sheets, the corrugation or other indentation patterns will not incorporate curvature radii below about 2 mm or 100× the thickness of the sheet. Further, the corrugations or other indentations will preferably not exceed about 2 mm in height as measured from the base plane of the sheet.

A particular advantage of the invention is that alternative indentation patterns adapted to specific applications for strain-tolerant ceramic sheets may be developed to meet particular needs. For example, where high flatness in selected sheet portions is required to meet special electrical contact or electrode processing requirements, sheets incorporating flat sections together with sections incorporating patterned indentations can be provided.

Figure 3:
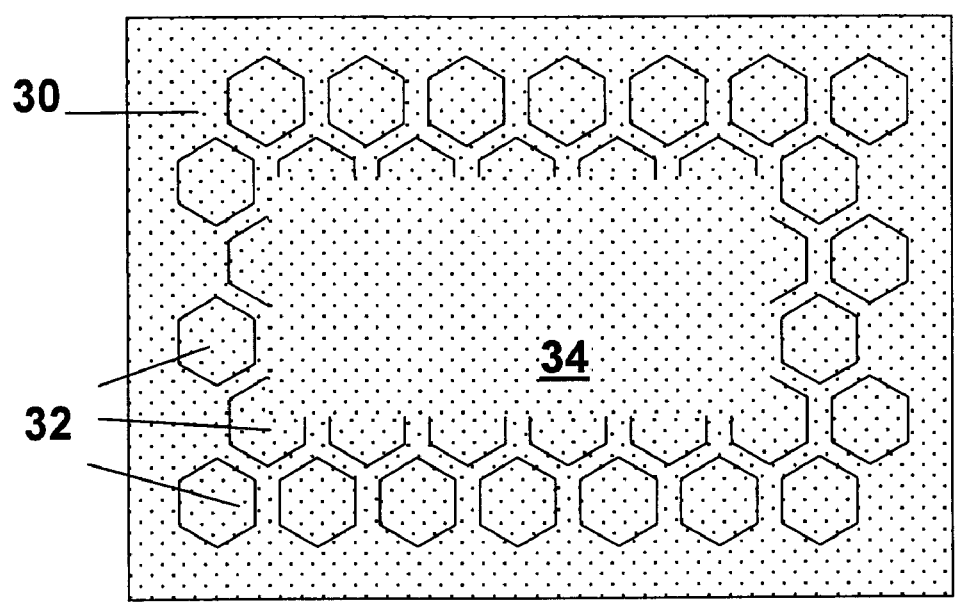
FIG. 3 illustrates forming apparatus useful for the production of electrolyte sheet such as shown in FIG. 1.

FIG. 3 of the drawing illustrates one sheet design of this type, incorporating a multi-directionally corrugated or indented border portion 30 incorporating hexagonal indentations 32 surrounding a rectangular flat central section 34. This design is particularly well adapted for applications wherein the sheet is to be edge-mounted in a surrounding frame. For a mounting of this type the flat central section of the sheet is isolated from undue stress in all directions in the sheet plane by the surrounding, highly strain tolerant indented border section. Further, the strain-tolerant edge portions facilitate edge mounting since gas-tight edge seals requiring larger sheet deformations can be accommodated with a lower risk of sheet failure.

The importance of high multi-directional strain tolerance in ceramic sheets intended for use as fuel cell electrolytes can be better appreciated from a consideration of the damaging effects of thermal stress on the components of fuel cells, especially fuel cells that are subjected to frequent thermal cycling. One fuel cell design to be considered incorporates a yttria-stabilized zirconia electrolyte sheet mounted in a relatively massive surrounding frame that functions as a sheet separator and enclosure for fuel or oxidant gases to be supplied to the sheet. Such frames will be of much higher thermal mass than the electrolyte sheet and its supported electrode layers.

In some designs the electrolyte/electrode sheets will be mounted in these frames so that they will be substantially unstressed at fuel cell operating temperatures. If a fuel cell operating temperature of 800 C. is specified and the cell is turned off, the electrode/electrolyte sheet will cool to ambient temperatures much more rapidly than the frame. In fact, it can be determined from the known thermal expansion coefficient of yttria-stabilized zirconia ($110 \times 10^{-7}/°$ C.) that a strain as high as 0.9% can be developed in an electrolyte/electrode sheet mounted in such a frame at the point of maximum sheet/frame temperature differential during the cooling process. This strain can readily be accommodated by the strain-tolerant electrolyte sheets of the invention.

Other corrugation or indentation designs that are free of straight ridge or flat lines and thus provide high strain tolerance in accordance with the invention are illustrated by line representations in FIGS. 5b–5f of the drawing. In each of these drawings the lines indicate the outlines of the selected indentations, and straight lines traversing the entire indentation pattern are entirely absent.

The imprinting of green ceramic sheets with any of these various indentation patterns can readily be carried out in a continuous process, and can be accomplished at any one of a number of different points in the sheet forming process ranging from the time the green ceramic sheet is first cast to the point at which the dried green sheet is ready for sintering. Further, any of the various indentation patterns having the required shape and frequency characteristics may be used in combination with sheet configurations other than strictly planar configurations, including tubular or dome configurations, to increase multi-axial strain tolerance in tubular or other non-planar fuel cell designs.

For some applications, anisotropic corrugation patterns may be useful to impart anisotropic strain tolerance and stiffness to the sheet. Depending upon the particular thermal and mechanical environment in which the ceramic sheet is to be used, higher strain tolerance in one direction than another may be required. One example of such an environment would be a fuel cell design wherein steeper thermal gradients are expected along one axis than along other axes, due to irregular gas flow patterns across the electrolyte. The use of different indentation patterns at different locations on a single sheet may also be useful to compensate for uneven temperature distributions within the cell. These and numerous other modifications of the products, materials, processes and apparatus hereinabove described will be resorted to by those skilled in the art within the scope of the appended claims.

We claim:

1. A solid oxide fuel cell module comprising:
   (a) a flexible ceramic electrolyte sheet of generally planar configuration having a surface indentation pattern comprising multiple indentations selected from the group consisting of multi-directional corrugations or waves, protrusions, and indentations, said indentation pattern providing a multiaxial strain tolerance not less than 0.5% in any direction in the sheet plane;
   (b) a cathode layer disposed on a first side of the electrolyte sheet; and
   (c) an anode layer disposed on a second side of the electrolyte sheet.

2. A solid oxide fuel cell module in accordance with claim 1 wherein said multiaxial strain tolerance is at least 1% in all directions in the sheet plane.

3. A solid oxide fuel cell module incorporating a flexible ceramic electrolyte sheet of generally planar configuration incorporating anodes and cathodes on opposing surfaces thereof, the sheet having at least one surface portion incorporating a surface indentation pattern comprising an array of surface indentations, protrusions and/or multi-directional corrugations, wherein:
   (a) the surface indentation pattern is positioned such that the surface portion is free of uninterrupted ridge or flat lines traversing the surface portion;
   (b) the surface indentation pattern does not exceed 2 mm in height from the sheet plane; and
   (c) the array imparts a theoretical strain tolerance of at least about 0.5% to the surface portion.

4. A solid oxide fuel cell module in accordance with claim 3 wherein the surface indentation pattern imposes curvature radii of not less than 2 mm in the surface of the ceramic electrolyte sheet.

5. A solid oxide fuel cell module in accordance with claim 3 wherein the pattern comprises multiple indentations and/or protrusions of hexagonal, circular, or Penrose tile shape.

6. A solid oxide fuel cell module in accordance with claim 3 wherein the flexible ceramic electrolyte sheet has a composition consisting predominantly of zirconia.

7. A solid oxide fuel cell module in accordance with claim 3 wherein the flexible ceramic electrolyte sheet incorporates one or more flat sections together with sections incorporating surface indentation patterns.

8. A solid oxide fuel cell module in accordance with claim 7 wherein the sheet incorporates a flat central section.

9. A solid oxide fuel cell module in accordance with claim 3 wherein the surface indentation pattern is an anisotropic pattern.

* * * * *